(12) United States Patent
Martin et al.

(10) Patent No.: US 8,230,424 B2
(45) Date of Patent: *Jul. 24, 2012

(54) GENERAL INTERFACE WITH ARBITRARY JOB MANAGERS

(75) Inventors: Jocelyn Luke Martin, Burwell (GB); Loren Dean, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1766 days.

This patent is subject to a terminal disclaimer.

(21) Appl. No.: 11/194,957

(22) Filed: Aug. 1, 2005

(65) Prior Publication Data
US 2007/0028242 A1    Feb. 1, 2007

(51) Int. Cl.
*G06F 9/46* (2006.01)
(52) U.S. Cl. ........................................................ 718/102
(58) Field of Classification Search ................... 718/102
See application file for complete search history.

(56) References Cited

U.S. PATENT DOCUMENTS

| | | | | |
|---|---|---|---|---|
| 4,972,314 | A * | 11/1990 | Getzinger et al. | 711/149 |
| 6,173,322 | B1 * | 1/2001 | Hu | 709/224 |
| 2002/0198920 | A1 * | 12/2002 | Resnick et al. | 709/100 |
| 2003/0187983 | A1 | 10/2003 | Rajic et al. | |
| 2004/0075864 | A1 * | 4/2004 | Kato et al. | 358/1.16 |
| 2004/0250249 | A1 * | 12/2004 | Fukunari et al. | 718/100 |
| 2005/0021594 | A1 * | 1/2005 | Bernardin et al. | 709/200 |
| 2005/0034130 | A1 * | 2/2005 | Skovira | 718/105 |
| 2005/0081208 | A1 | 4/2005 | Gargya et al. | |

OTHER PUBLICATIONS

Xue, Gang, et al, "Implementation of a Grid Computation Toolkit for Design Optimisation with Matlab and Condor", Euro-Par 2003 Parallel Processing Lecture Notes in Computer Science (Aug. 26-29, 2003, pp. 357-365).*
Platform Computing: "Platform LSF® Administrator's Primer—Version 6.1," retrieved online: ftp://ftp.platform.com/distrib/6.1/docs.pdf/manuals/lsf6.1_get_started.pdf (2006).
International Search Report for Application No. PCT/US2006/030226, dated Aug. 1, 2005.
Husbands, Parry Jones Reginald, "Interactive Supercomputing," pp. 1-96 (1999).
European Decision to Refuse a European Patent application for Application No. 06789282.8, dated Dec. 28, 2010.
Platform Computing Corporation, "Platform LSF Administrator's Primer, Version 6.1," (2004).
European Summons to Attend Oral Proceedings for Application No. 06789282.8, dated Jul. 19, 2010.

* cited by examiner

*Primary Examiner* — Emerson Puente
*Assistant Examiner* — Gregory Kessler
(74) *Attorney, Agent, or Firm* — Nelson Mullins Riley & Scarborough LLP

(57) ABSTRACT

A method, system and computer program product is disclosed for providing a distributed computing environment in which an arbitrary job manager or scheduler is able to be plugged. In the distributed computing environment, a job is created in a storage location to include one or more technical computing tasks and submitted to the arbitrary scheduler by transferring a reference to the storage location of the job. Since a reference to the storage location of the job is transferred to the scheduler, the interface with the scheduler can be implemented regardless of the scheduler. The scheduler then transfers the reference to the storage location of the job to one or more remote workers.

27 Claims, 5 Drawing Sheets

GENERAL INTERFACE WITH ARBITRARY JOB MANAGERS

RELATED APPLICATION

This application is related to U.S. patent application Ser. No. 10/940,151 filed on Sep. 13, 2004 now issued as U.S. Pat. No. 7,502,745, and U.S. patent application Ser. No. 11/195,927 filed on Aug. 2, 2005, which is incorporated herewith by reference.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to a distributed computing environment and more particularly to systems, methods and mediums for providing a general interface with arbitrary job managers in the distributed computing environment.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming language such as Fortran or C.

As a desktop application, MATLAB® allows scientists and engineers to interactively perform complex analysis and modeling in their familiar worker environment. However, a single worker can be limiting to the size of the problem that can be solved, because of the relationship of the computing power of the worker to the computing power necessary to execute computing intensive iterative processing of complex problems in a reasonable time. For example, a simulation of a large complex aircraft model may take a reasonable time to run with a single computer with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single computer would take an unreasonable or undesirable amount of time to perform these simulations. In this case, the single computer would be allocated full-time to performing the computation while many computer resources on the network may be idle. Additionally, the benefit of the interactive features of the software is reduced as the computation time increases.

With many engineering and scientific problems requiring larger and more complex modeling, computations accordingly become more resource intensive and time-consuming. When a computation becomes so large and complex that it cannot be completed in a reasonable amount of time on a single computer, a solution to decrease the computation time is needed. As a solution, distributed computing systems have been provided to deal with a large and complex engineering and scientific computation. In the distributed computing systems, a job manager or scheduler may be employed to distribute a given computation to remote computing entities so that the remote computing entities are able to perform the distributed computation. The job manager or scheduler may be provided by various vendors, and may be unique in many respects. Therefore, it is needed for the distributed computing environment to interface with arbitrary job managers provided by arbitrary vendors (i.e., any one of a number of different job managers).

Co-pending U.S. patent application Ser. No. 10/940,151 filed on Sep. 13, 2004, which is a continuation-in-part of pending U.S. Applications Nos. 10/729,752 filed Dec. 4, 2003, Ser. No. 10/896,671 filed Jul. 21, 2004 and Ser. No. 10/896,784 filed Jul. 21, 2004, discloses an interface with an arbitrary job manager or scheduler, which is specific to the job manager or scheduler. Since the interface is specific to the job manager or scheduler, an interface must be built whenever a new job manager or scheduler is plugged in. Therefore, there is a need for a general interface that can be used independently of the job managers or schedulers.

SUMMARY OF THE INVENTION

The present invention provides a distributed computing environment in which an arbitrary job manager or scheduler may be successfully used without the need for building a custom interface for each variety of job managers. In the distributed computing system of the present invention, a job may be created by a host or client to include one or more tasks and submitted to the arbitrary job manager for distributing the job to one or more remote workers. The job or tasks may be created in a storage location that can also be accessed by the remote workers.

The present invention provides a generalized interface with the arbitrary job manager to establish communication channels with the arbitrary job manager. This generalized interface may be used with a variety of job managers. The interfaces with the arbitrary job manager may establish communication channels between the host or client and the arbitrary job manager so that the host or client is able to submit the job to the arbitrary job manager through the communication channels. The job may be submitted to the arbitrary scheduler by transferring a reference to the storage location of the job to the scheduler.

The interfaces with the arbitrary job manager may also establish communication channels between the arbitrary job manager and the remote workers so that the arbitrary job manager is able to distribute the tasks in the job to the remote workers through the communication channels. The scheduler may transfer the reference to the storage location of the job or tasks to the remote workers. Since the scheduler handles the reference to the storage location of the job or tasks, the interfaces with the scheduler can be independent of the scheduler.

The remote workers may access the storage location using the reference to the storage location of the job or tasks. The remote workers retrieve and execute the designated one or more tasks, and save the result of executing the one or more tasks in the storage location. The remote workers return the information that the designated one or more tasks have been executed to the arbitrary scheduler, which, in turn, forwards the information to the host or client. The host or client can retrieve the result of executing the job from the storage location.

In one aspect of the present invention, a method is provided for creating and submitting a job to a scheduler. The method includes the step of creating the job in a storage location to include one or more technical computing tasks. The method also includes the steps of establishing a communication channel with the scheduler, and submitting the job to the scheduler by transferring a reference to the storage location of the job to the scheduler through the communication channel with the scheduler.

In another aspect of the present invention, a method is provided for receiving and executing a job. The method includes the steps of establishing a communication channel with a scheduler, and receiving from the scheduler a reference to the storage location of the job through the communication channel. The method includes the step of retrieving the job from the storage location using the reference to the storage location of the job.

In another aspect of the present invention, a system is provided to include a storage location for storing a job including one or more technical computing tasks. The system also includes a client for creating the job in the storage location, and an interface for establishing a communication channel between the client and a scheduler so that the client submits the job to the scheduler by transferring a reference to the storage location of the job to the scheduler through the communication channel with the scheduler.

In another aspect of the present invention, a medium is provided holding instructions executable in an electronic device for a method. The method includes the step of creating a job in a storage location to include one or more technical computing tasks. The method also includes the steps of establishing a communication channel with the scheduler, and submitting the job to the scheduler by transferring a reference to the storage location of the job to the scheduler through the communication channel with the scheduler.

In another aspect of the present invention, a medium is provided holding instructions executable in an electronic device for a method. The method includes the steps of establishing a communication channel with a scheduler, and receiving from the scheduler a reference to a storage location of a job through the communication channel. The method includes the step of retrieving the job from the storage location using the reference to the storage location of the job.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
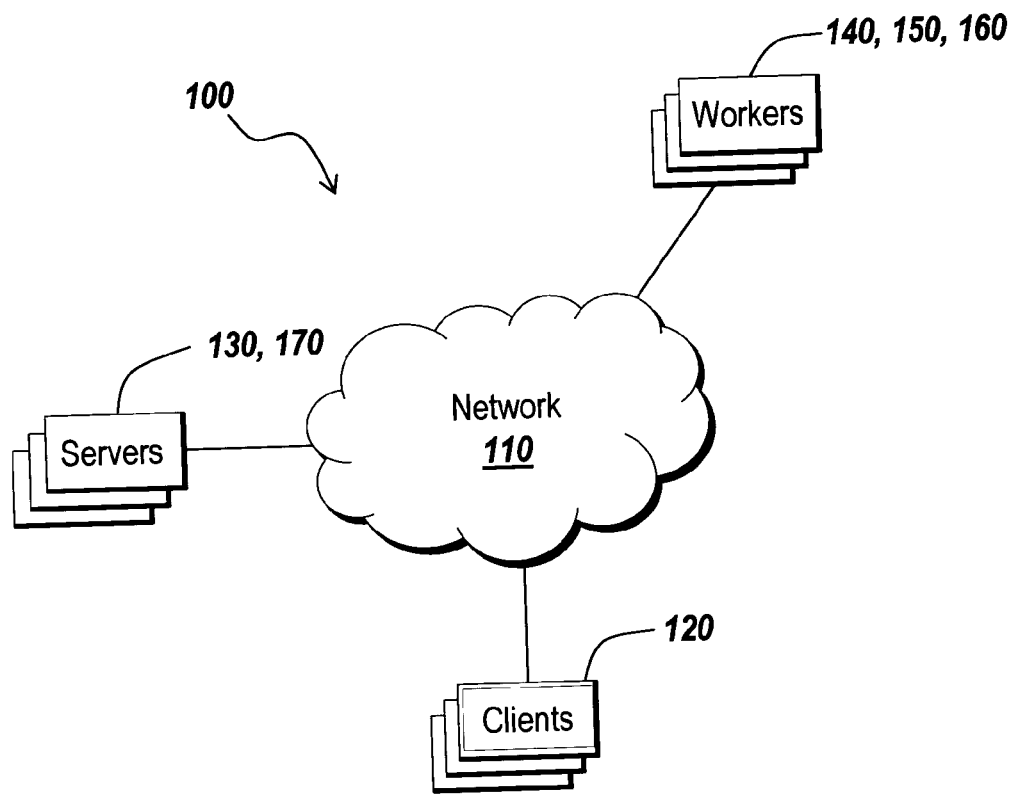
FIG. 1 is an exemplary block diagram of a network for implementing a distributed computing environment.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a distributed computing environment in which an arbitrary scheduler may be used (i.e. "plugged in"). In the distributed computing environment of the illustrative embodiment, tasks can be created by a technical computing client and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks.

The illustrative embodiment will be described solely for illustrative purposes relative to a MATLAB®-based distributed computing environment. The MATLAB®-based distributed computing environment provides the Distributed Computing Toolbox and the MATLAB® Distributed Computing Engine to enable users to execute coarse-grained MATLAB® algorithms and Simulink® models in a cluster of computers. Users can prototype and develop applications in the MATLAB® environment and then use the Distributed Computing Toolbox to divide them into independent tasks. The MATLAB® Distributed Computing Engine evaluates these tasks on remote MATLAB sessions. The Distributed Computing Toolbox, together with the MATLAB® Distributed Computing Engine, substantially reduces overall execution time for many types of applications, including those in which algorithms or models are executed repeatedly on varying data sets.

Although the illustrative embodiment will be described relative to a distributed MATLAB®-based application, one of ordinary skill in the art will appreciate that the present invention may be applied to distributing the processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

In the illustrative embodiment of the present invention, a job is created to include technical computing tasks, and submitted to an arbitrary scheduler for distributing the job to remote technical computing workers for execution of the tasks on multiple computers systems. The job and tasks may be created in a storage location that can be accessed by the remote workers. The job and tasks may be created in different formats in different embodiments. The illustrative embodiment utilizes the MAT-file format to create the job and tasks in the storage location. Those of ordinary skill in the art will appreciate that the MAT-file format is an illustrative format and the job and tasks can be created in any other format, such as a binary format or a serial format.

The job may be submitted to the arbitrary scheduler by transferring to a reference to the storage location of the job. The reference to the storage location of the job can be transferred to the arbitrary scheduler through the interface that establishes a communication channel between the technical computing client and the arbitrary job manager. Subsequently, the scheduler may transfer the reference to the storage location of the job or tasks to remote workers through the interfaces that establish communication channels between the arbitrary job manager and the remote workers. Since the scheduler handles the reference to the storage location of the job or tasks, the interfaces with the scheduler can be independent of the scheduler. The remote workers may access the storage location using the reference to the storage location of the job or tasks. The remote workers retrieve and execute the designated one or more tasks, and save the result of executing the one or more tasks in the storage location. The remote workers return information that the task or tasks have been executed to the arbitrary scheduler, which, in turn, forwards the information to the host or client. The host or client can retrieve the result of executing the job from the storage location.

In the illustrative embodiment, the scheduler refers to a process or program that tracks the progress of and allocates resources for a series of tasks. Although the scheduler generally refers to a job manager or task manager with additional functions, the terms including scheduler, job manager and task manager are used interchangeably in the description of the illustrative embodiment of the present invention.

FIG. 1 is an exemplary network environment 100 suitable for the distributed computing of the illustrative embodiment. The network environment 100 may include servers 130 and 170 coupled to clients 120 via a communication network 110. The servers 130 and 170 may also be coupled to workers 140, 150 and 160 via the communication network 110. The clients 120, servers 130 and 170, and workers 140, 150 and 160 can be implemented on the computing device, which is described below in more detail with reference to FIG. 2. The clients 120, servers 130 and 170, and workers 140, 150 and 160 may include network interfaces and/or modems that enable the clients 120, servers 130 and 170, and workers 140, 150 and 160 to communicate with other clients 120, servers 130 and 170, and workers 140, 150 and 160 through the communication network 110. The communication network 110 may include Internet, intranet, LAN (Local Area Network), WAN (Wide Area Network), MAN (Metropolitan Area Network), etc. The communication facilities can support the distributed implementations of the present invention. The clients 120, servers 130 and 170, and workers 140, 150 and 160 will be described below in more detail with reference to FIG. 3.

Figure 2:
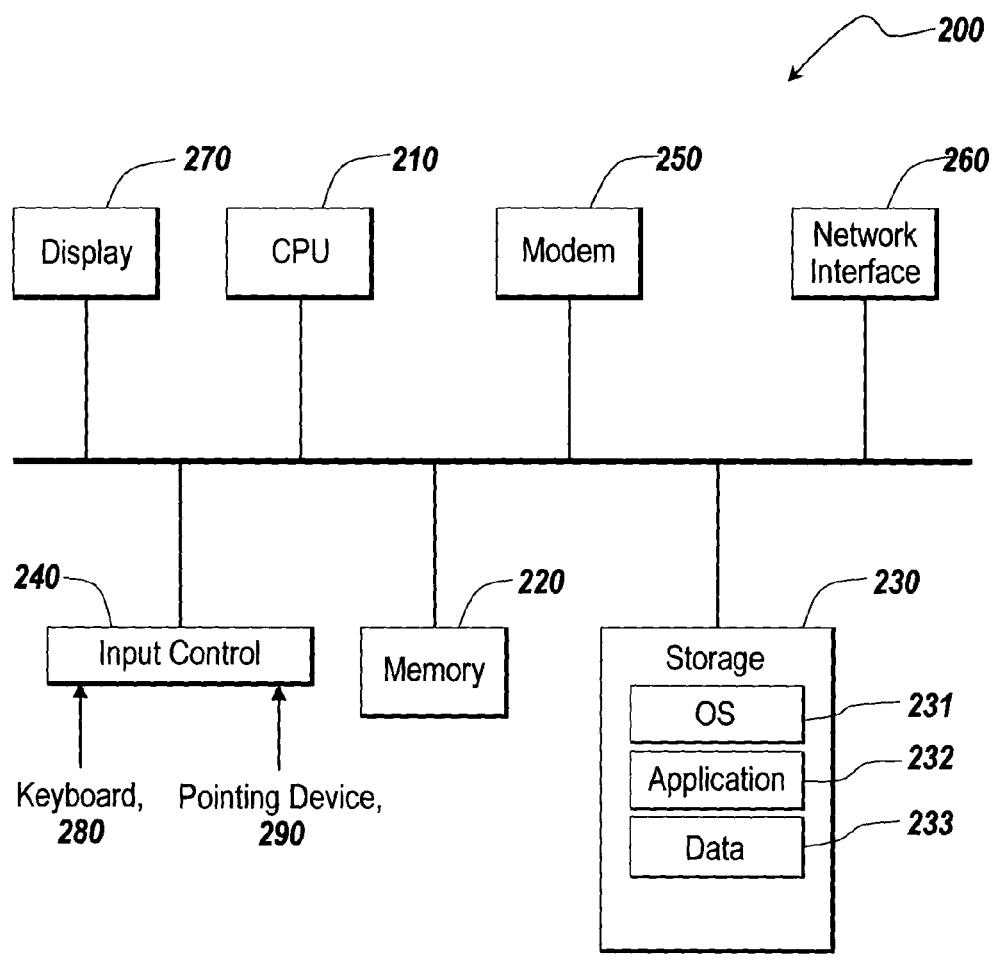
FIG. 2 is an exemplary block diagram showing a computing device for the clients, servers or workers depicted in FIG. 1.

FIG. 2 is an exemplary computing device 200 suitable for implementing the servers practicing the illustrative embodiment of the present invention. The computing device 200 may take many forms, including but not limited to a worker, server, network computer, quantum computer, optical computer, bio computer, Internet appliance, mobile device, a pager, a tablet computer, and the like. One of ordinary skill in the art will appreciate that the computing device 200 is intended to be illustrative and not limiting of the present invention.

The computing device 200 may be electronic and include a Central Processing Unit (CPU) 210, memory 220, storage 230, an input control 240, a modem 250, a network interface 260, a display 270, etc. The CPU 210 controls each component of the computing device 200 to provide the distributed computing environment. The memory 220 temporarily stores instructions and data and provides them to the CPU 210 so that the CPU 210 operates the computing device 200 and runs the distributed computing environment. The memory 220 may include a computer system memory or random access memory such as DRAM, SRAM, EDO RAM, etc. The memory 220 may also include other types of memory as well, or combinations thereof. The storage 230, such as a hard-drive or CD-ROM, usually contains software tools for applications. The storage 230 includes, in particular, code for the operating system (OS) 131 of the device 200, code for applications 132 running on the operation system including applications for providing the distributed computing environment, such as MATLAB® distributed computing environments, and data 233 for jobs and tasks created in the distributed computing environment and the results of executing the jobs and tasks. The input control 240 may interface with a keyboard 280, a pointing device 290, and other input devices. The computing device 200 may receive through the input control 240 input data necessary for creating jobs and tasks. The computing device 200 may display in the display 270 user interfaces for the users to create the job and tasks. The computing device 200 may also display other user interfaces for the users to interact with the computing device 200 through the display 270, such as a computer monitor, which may include a graphical user interface (GUI). The modem 250 and network interface 260 enable the clients 120, servers 130 and 170, and workers 140, 150 and 160 to communicate with other clients 120, servers 130 and 170, and workers 140, 150 and 160 through the communication network 110.

Figure 3:
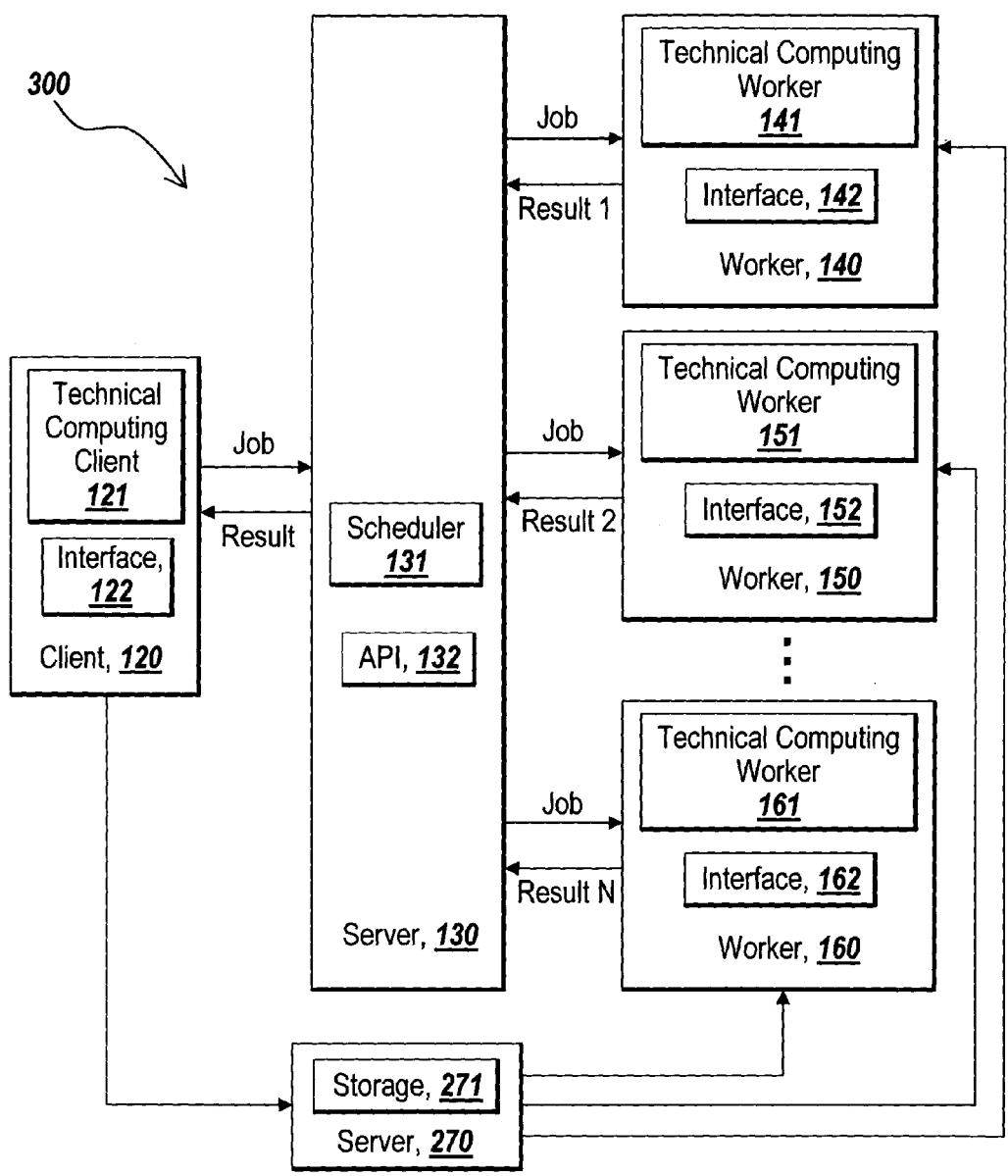
FIG. 3 is an exemplary block diagram showing the details of the distributed computing environment.

FIG. 3 shows an illustrative embodiment of an exemplary distributed computing system 300. The distributed computing system 300 includes a technical computing client 121 running on a client 120 in communications over a network communication channel to servers 130 and 170 on the network 110. The server 130 includes an arbitrary scheduler 131. The scheduler 131 communicates over a network communication channel on the network 110 to the technical computing workers 141, 151 and 162 on the workers 140, 150 and 160. The distributed computing system 300 allows the technical computing client 121 to use the computing resources that may be available from technical computing workers 141, 151 and 161 on the workers 140, 150 and 160 to perform technical computing of tasks. This frees up the technical computing client 121 to perform other tasks, or the client 120 to execute other software applications. The technical computing workers 141, 151 and 161 may be available on an as needed basis to the technical computing client 121. When not performing technical computing of tasks from the technical computing client 121, the workers 140, 150 and 160 of the technical computing workers 141, 151 and 161 can be executing other software programs, or the technical computing workers 141, 151 and 161 can perform technical computing of tasks from other technical computing clients. Those of ordinary skill in the art will appreciate that the system 300 is illustrative and the server 130 may serve for multiple clients and the client 120 may request services from multiple servers in other embodiments.

The technical computing client 121 can be a technical computing software application that provides a technical computing and graphical modeling environment and to define mathematical algorithms for simulating models. The technical computing client 121 can be a MATLAB® distributed computing client, which may include all or a portion of the functionality provided by the standalone desktop application of MATLAB®. Additionally, the technical computing client 121 can be any of the software programs available in the MATLAB® product family. Furthermore, the technical computing client 121 can be a custom software program or other software that accesses MATLAB® functionality via an interface, such as an application programming interface, or by other means. One ordinarily skilled in the art will appreciate the various combinations of client types that may access the functionality of the system.

With the programming language of the technical computing client 121, functions can be defined representing a technical computing task to be executed by either a technical computing environment local to the client 120, or remote on a worker. The local technical computing environment may be part of the technical computing client 121, or a technical computing worker running on the client 120. The programming language includes mechanisms to define a job to be distributed to a technical computing environment and to communicate the job to the technical computing worker on the worker, or alternatively, on the client 120. For example, the technical computing client 121 may declare a function to generate a random set of ten numbers and further delegate that the technical computing worker running on the worker execute the function. Also, the programming language of the MATLAB® distributed computing client includes mechanisms to receive information regarding a result from the execution of technical computing of the job from another technical computing environment.

In the illustrative embodiment, the server 170 includes storage 271 and the job is created in the storage 271. The storage 271 can be provided in any of the servers coupled to the network 110 so that technical computing client 121 on a client 120 can access the storage 271 to create the jobs in the storage 271 and the technical computing workers 141, 151 and 162 on the workers 140, 150 and 160 can access the storage 271 to retrieve the tasks from the storage 271. The storage 271 may store the job in different format in different embodiments. The illustrative embodiment utilizes the MAT-file format to create the job in the storage 271. The MAT-file format stores data in binary form and support MATLAB® array types including multidimensional numeric arrays, character arrays, sparse arrays, cell arrays, structures and objects. The MAT-file format includes a header and one or more data elements. Each data element includes a tag and data. The tag specifies the number of bytes in the data element and the type of data in the data element. By using the tags, the MAT-file format provides quick access to individual data elements in the MAT-file. Those of ordinary skill in the art will appreciate that the MAT-file format is an illustrative format and other formats can be used in other embodiments.

The technical computing client 120 includes an interface 122 that enables the arbitrary scheduler 131 on the server 130 to interface with the technical computing client 121 on the client 120. The interface 122 establishes the communication channel between the technical computing client 121 and the arbitrary scheduler 131 so that the technical computing client 121 is able to submit the job to the arbitrary scheduler through the communication channel. In addition, the technical computing client 120 also receives information regarding a result from the execution of the job through the communication channel established by the interface 122 between the technical computing client 121 and the arbitrary scheduler 131. One of ordinary skill in the art will appreciate that the interface 122 may be provided in the technical computing client 121 or in the network interface 260.

The scheduler 131 is an arbitrary scheduler provided by any of a number of vendors. The arbitrary scheduler 131 may include or be associated with an automatic task distribution mechanism for the automatic distribution of tasks from the technical computing client 121 to the technical computing workers 141, 151 and 161. The automatic task distribution mechanism may allow the technical computing client 121 to delegate the task distribution to the automatic task distribution mechanism. For example, a task can be created and submitted to the arbitrary scheduler 131 without specifying which technical computing worker is to perform the technical computing of the task. The technical computing client 121 does not need to know the specifics of the technical computing worker. The technical computing client can define a function to submit the task to the arbitrary scheduler 131, and get information regarding a result of the task from the arbitrary scheduler 131. As such, the arbitrary scheduler 131 provides a level of indirection between the technical computing client 121 and the technical computing worker.

This eases the distributed programming and integration burden on the technical computing client 121. The technical computing client 121 does not need to have prior knowledge of the availability of the technical computing workers 141, 151 and 161. For multiple task submissions from the technical computing client 121, the arbitrary scheduler 131 can manage and handle the delegations of the tasks to the same technical computing worker 141, or to other technical computing workers, and hold information regarding the results of the tasks on behalf of the technical computing client 121 for retrieval after the completion of technical computing of all the distributed tasks.

The technical computing workers 141, 151 and 161 can be a technical computing software application that provides a technical computing environment for performing technical computing of tasks, such as those tasks defined or created by the technical computing client 121. The technical computing workers 141, 151 and 161 can be a MATLAB® distributed computing application, module, service, software component, or a session, which includes support for technical computing of functions defined in the programming language of MATLAB®. The technical computing workers 141, 151 and 161 can include all the functionality and software components of the technical computing client 121, or it can just include those software components it may need to perform technical computing of tasks it receives for execution. The technical computing workers 141, 151 and 161 may be configured to and capable of running any of the modules, libraries or software components of the MATLAB® product family. As such, the technical computing workers 141, 151 and 161 may have all or a portion of the software components of MATLAB® installed on the workers 140, 150 and 160, or alternatively, accessible on another system in the network 110. The technical computing workers 141, 151 and 161 are capable of performing technical computing of the task as if the technical computing client 121 was performing the technical computing in its own technical computing environment.

The workers 140, 150 and 160 include interfaces 142, 152 and 162 that enable the arbitrary scheduler 131 on the server 130 to interface with the technical computing workers 141, 151 and 162 on the workers 140, 150 and 160, respectively.

The interfaces 142, 152 and 162 establish the communication channels between the arbitrary scheduler 131 and the technical computing workers 141, 151 and 161 so that the arbitrary scheduler 131 is able to distribute the job or tasks to the technical computing workers 151, 161 and 271 through the communication channels. In addition, the arbitrary scheduler may also receive information regarding the result from the execution of the tasks through the communication channels. One of ordinary skill in the art will appreciate that the interfaces 142, 152 and 162 may be provided in the technical computing workers 141 and 151 and 161 or in the network interface 260.

The interfaces 122, 142, 152 and 162 are able to establish communication channels with an arbitrary scheduler supplied from various venders and independent of an "interface protocol" or "interface format" of the arbitrary scheduler. The "interface protocol" or "interface format" refers to a set of rules for transmitting data and receiving data from the arbitrary scheduler. The set of rules is capable of defining a data format for transferring data to or receiving data from an arbitrary scheduler and is further capable of defining at least a type of error checking, if any, to be used for data transmissions; a data compression method, if any; how the sending mechanism will indicate that it has finished sending data; how the arbitrary scheduler will indicate that it has received data. The interfaces 122, 142, 152 and 162 will be described below in more detail with reference to FIG. 4.

Figure 4:
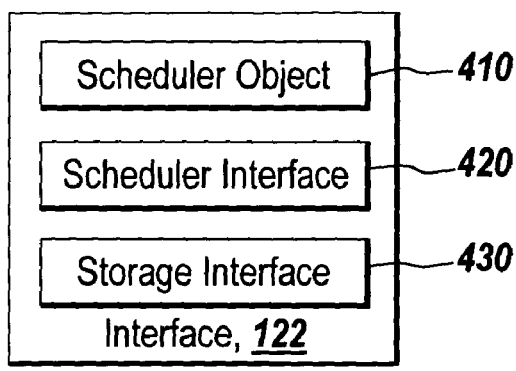
FIG. 4 is a block diagram showing an exemplary interface of the distributed computing system to an arbitrary scheduler.

FIG. 4 is a block diagram showing an exemplary interface 122 in the illustrative embodiment. Those of ordinary skill in the art will appreciate that FIG. 4 depicts an exemplary interface 122 of the technical computing client 121 on the client 120, and the interfaces 142, 152 and 162 of the technical computing workers 141, 151 and 161 on the workers 140, 150 and 160 may be implemented in a similar manner. The interface 122 may include a scheduler object 410, a scheduler interface 420 and a storage interface 430. In the description below, the scheduler object 410, the scheduler interface 420, and the storage interface 430 are discussed as distinct entities, nonetheless those skilled in the art will appreciate that two or more of them may be implemented as a single entity.

Figure 5:
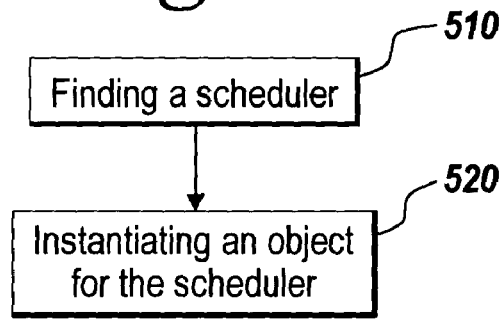
FIG. 5 is a flow chart illustrating an exemplary operation for finding and creating an object for the arbitrary scheduler.

The scheduler object 410 represents the scheduler 131 in the technical computing client 121 running on the client 120. FIG. 5 is a flow chart showing an exemplary operation to create the scheduler object 410 in the interface 122. The client 120 finds a scheduler or schedulers on the network 110 and registers the scheduler in its interface 122 (step 510). In the MATLAB® distributed computing environment, users can use the "findresource" command to identify available schedulers and to create the scheduler object 410 representing the scheduler 131 in the technical computing client 121. When the users have identified a scheduler, users can isolate it and create a single object 410 on the client 120 (step 520). An exemplary code for finding a scheduler and creating a scheduler object is provided as follows.

```
>> lsf = findresource('scheduler', 'name', 'lsf');
>> lsf
lsf =
    distcomp.lsfscheduler
```

The exemplary code shows that a scheduler object, lsf, is generated using the "findresource" command. The scheduler object may include inputs such as a name given to a unique scheduler identifier, and other like inputs. The scheduler object 410 is associated with the arbitrary scheduler 131 uniquely identified by the inputs of the scheduler object 410. Users can examine the properties of the scheduler object 410 to identify which one the users want to use. An exemplary code for displaying the properties of the scheduler object 410 is provided as follows.

```
>> get(lsf)
    DataLocation: '/home/jlmartin/project1'
    HasSharedFilesystem: 1
        Jobs: [0x1 double]
        ClusterName: 'UK_LSF_DEVEL_CLUSTER'
        MasterName: 'ukdev00glnxa64.mathworks.co.uk'
        SubmitArguments: '-R "type==any"'
```

One of skill in the art will appreciate that the properties of the scheduler object 410 in the exemplary code described above are illustrative and the scheduler object 410 may include other properties. One list of these properties and functions is described below.

| Scheduler Object Properties | |
|---|---|
| Property Name | Property Description |
| DataLocation | Indicate the storage location of the job |
| MasterName | Indicate name of the master machine |
| Jobs | Indicate the jobs in the storage location |
| ClusterName | Indicate the name of the LSF cluster which the user is using |
| HasSharedFileSystem | Indicate whether there is a shared file system between the client and workers |
| SubmitArgument | Indicate arguments specific to the scheduler |

| Scheduler Object Functions | |
|---|---|
| Method Name | Method Description |
| findJob | Find job objects in a job queue |
| Pause | Pause the scheduler queue |
| Resume | Resume processing of the scheduler queue |

The scheduler object 410 includes properties generic to the arbitrary schedulers. For example, the DataLocation property indicates the storage location of the job in the storage 271. The storage location can be specified using a disk location (/home/jlmartin/project1), as described above. One of ordinary skill in the art will appreciate that the storage location may be specified in other ways, such as a machine name and a TCP port number, or an IP address and a TCP port number. For example, the storage location may be specified by 'jdbc: mysql:port@machine:/database/name' which uses a database connection to TCP port number 'port' at machine called 'machine' and the database called 'database/name'. The DataLocation property may refer to an absolute path to the storage location, where each job or tasks can then be stored at a relative path within the absolute path.

Users may change the DataLocation property to a different storage location when the users want to use a different storage location. For example, users may have two projects to perform and the data locations for these projects can be /home/jlmartin/project1 and /home/jlmartin/project2, respectively. When creating jobs for the first project (project1), users can set DataLocation to /home/jlmartin/project1, and when creating jobs for the second project (project2), users can change the DataLocation to /home/jlmartin/project2. When DataLocation changes, the Jobs property of the scheduler object 410 may also change because a different job is stored at a different storage location. The following code shows an exemplary change of the DataLocation property of the scheduler object 410.

```
>> lsf.DataLocation = '/home/jlmartin/project2'
lsf =
     distcomp.lsfscheduler
>> lsf.get
     DataLocation: '/home/jlmartin/project2'
HasSharedFilesystem: 1
     Jobs: [2x1 distcomp.simplejob]
     ClusterName: 'UK_LSF_DEVEL_CLUSTER'
     MasterName: 'ukdev00glnxa64.mathworks.co.uk'
     SubmitArguments: '-R "type==any"'
```

The exemplary code shows that the DataLocation property of the scheduler object 410 changes to /home/jlmartin/project2, and the Jobs property of the scheduler object 410 also changes to indicate a job stored at /home/jlmartin/project2.

The scheduler object 410 may include properties that are specific to the arbitrary schedulers. The properties specific to the arbitrary schedulers can be obtained using the application program interface (API) 132 of the scheduler 131 provided on the server 130. For example, the SubmitArguments property is specific to the scheduler 131. The SubmitArguments property can be used to allow users to specify arguments with the submission of the job. For example, users can specify that the job only runs on linux64 machines by setting the SubmitArguments property to '-R "type==LINUX64"'. The scheduler 131 interprets the arguments at the point it distributes the job to the remote workers.

Referring back to FIG. 4, the scheduler interface 420 is responsible for communicating between the technical computing client 121 and the arbitrary scheduler 131. When the technical computing client 121 calls the scheduler interface 420, the scheduler interface 420 communicates with the arbitrary scheduler 131, and establishes a connection or communication channel between the technical computing client 121 and the arbitrary scheduler 131. The scheduler interface 420 may use information contained in the scheduler object 410 to establish the communication channel between the technical computing client 121 and the arbitrary scheduler 131. The scheduler interface 420 is capable of interfacing with arbitrary schedulers of different vendors. The scheduler interface 420 may support interfaces with the arbitrary schedulers regardless of the vendors of the schedulers. Those skilled in the art will recognize that depending on the arbitrary scheduler 131 and the capabilities of the arbitrary scheduler 131, the interface 122 can offer multiple threads or multiple communication channels between the technical computing client 121 and the arbitrary scheduler 131 or between the technical computing client 121 and multiple arbitrary schedulers.

The storage interface 430 allows the technical computing client 121 to communicate with the storage 271. In the illustrative embodiment, the job is stored in a MAT-file format using the "save" function provided in MATLAB®. The "save" function encodes the job to a continuous byte stream. When the workers retrieve the job, the job can be restored using the "load" command provided in MATLAB®.

The interface 122 using the scheduler interface 420 and the storage interface 430 establishes and provides communication channels between the technical computing client 121 and the arbitrary scheduler 131 and between the technical computing client 121 and the storage 271. The communication channels operate in a manner independent of the vendor of the arbitrary scheduler thus allowing the technical computing client 121 to interface with the arbitrary scheduler 131 and the storage 271 regardless of the vendor of the scheduler. Although the scheduler interface 420 and the storage interface 430 are described as distinct entities in the illustrative embodiment, those skilled in the art will appreciate that the scheduler interface 420 and the storage interface 430 may be implemented as a single entity.

Figure 6:
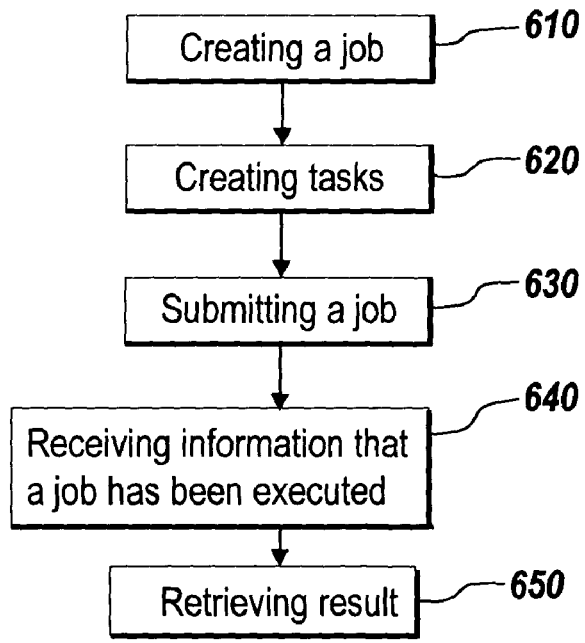
FIG. 6 is a flow chart illustrating an exemplary operation for creating and submitting a job to the arbitrary scheduler.

FIG. 6 is a flow chart showing an exemplary operation for creating and submitting a job to a scheduler. Users can create the job in the storage 271 (step 610). With the programming language of the technical computing client 121, a job can be defined to include technical computing tasks so that the job or tasks are distributed to and executed by remote technical workers 141, 151 and 161. For example, the following command creates a job in a storage location, such as /home/jlmartin/project1 and /home/jlmartin/project2, that is specified by the DataLocation property of the scheduler object 410.

```
>> j = createJob(lsf)
j =
     distcomp.simplejob
```

Users can see the properties of the job object with the following statement in MATLAB®.

```
>> get(j)
     Type: 'job'
     Name: 'Job3'
     ID: 3
     UserName: 'jlmartin'
     Tag: ''
     State: 'pending'
     CreateTime: 'Thu Jun 02 13:56:44 BST 2005'
     SubmitTime: ''
     StartTime: ''
     FinishTime: ''
     Tasks: [0x1 double]
     FileDependencies: {0x1 cell}
     JobData: [ ]
     Parent: [1x1 distcomp.lsfscheduler]
     UserData: [ ]
```

Users can change the properties of the job. For example, users can change the Tag property of the job as follows.

```
>> set(j, 'Tag', 'Hello')
>> get(j)
     Type: 'job'
     Name: 'Job3'
     ID: 3
     UserName: 'jlmartin'
     Tag: 'Hello'
     State: 'pending'
     CreateTime: 'Thu Jun 02 13:56:44 BST 2005'
     SubmitTime: ''
     StartTime: ''
     FinishTime: ''
     Tasks: [0x1 double]
```

-continued

```
FileDependencies: {0x1 cell}
       JobData: [ ]
        Parent: [1x1 distcomp.lsfscheduler]
       UserData: [ ]
```

The created job has no callbacks or links to a scheduler, which means that the job is created independently of the scheduler 131 on the network 110. The State property of the job is "pending," which means that the job has not been submitted for running on the scheduler 131, so users can add tasks to the job. After users have created the job, and while it is still in the pending state, users can create tasks for the job (step 620). Tasks define the functions to be evaluated by the workers during the running of the job. In the illustrative embodiment, a task defines a technical computing command, such as a MATLAB® command, to be executed, and the number of arguments and any input data to the arguments. An exemplary creation of a task is provided as follows.

```
>> t = createTask(j, @rand, 1, {1})
t =
      distcomp.simpletask
```

Users can see the properties of the task object with the following statement in MATLAB®.

```
>> get(t)
              Type: 'task'
              Name: 'Task1'
                ID: 1
           Function: @rand
   NumberOfOutputArguments: 1
        InputArguments: {[1]}
       OutputArguments: {1x0 cell}
  CaptureCommandWindowOutput: 0
      CommandWindowOutput: ''
             State: 'pending'
         ErrorMessage: ''
         ErrorIdentifier: ''
          CreateTime: 'Thu Jun 02 13:57:23 BST 2005'
          StartTime: ''
          FinishTime: ''
           Parent: [1x1 distcomp.simplejob]
          UserData: [ ]
```

The users can check the jobs and tasks created in the specified storage location. In the illustrative embodiment, users can view the list of jobs and tasks as follows.

```
>> ls lsf
Job1      Job1.in.mat    Job2     Job2.in.mat    Job3    Job3.in.mat
Job1.common.mat Job1.out.mat Job2.common.mat Job2.out.mat Job3.common.mat Job3.out.mat
>> ls lsf/Job1
Task1.common.mat Task1.in.mat Task1.log Task1.out.mat
>> ls lsf/Job2
Task1.common.mat   Task2.common.mat   Task3.common.mat   Task4.common.mat
Task1.in.mat       Task2.in.mat       Task3.in.mat       Task4.in.mat
Task1.out.mat      Task2.out.mat      Task3.out.mat      Task4.out.mat
```

Referring back to FIG. 6, after creating the job and tasks in the storage 271, the users then submit the job to the scheduler 131 to run the job and have its tasks evaluated in the remote workers 140, 150 and 160 (step 630). The job created in a specified storage location may be submitted to the scheduler 131 by transferring a reference to the storage location of the job. For example, in the illustrative embodiment, the reference to the storage location is a string of the form, \\mathworks\sandbox\jlmartin\lsf\data in a window-based system, and /sandbox/jlmartin/lsf/data in a UNIX system. Since the specific storage location resides on disk, it is sufficient to pass the reference to the file locations to the remote workers so that the workers can then retrieve the files. For a database storage location, the reference may be of the form, jdbc:mysql:365@martinjlinux.mathworks.com:/Project1, which indicates that the database to use is on the machine named 'martinjlinux.mathworks.com' at port 356, and that the database is a MySQL database and called Project1.

The scheduler may then distribute the job to remote workers for the evaluation of the tasks in the job. The scheduler may distribute the job to the workers 270 by transferring the reference to the storage location of the job or tasks to the workers. The job or tasks may include license information of the client 120. The workers may execute the job or tasks using the license information for the software components or products of the client 120. The execution of the job or tasks by the technical computing workers will be described below in more detail with reference to FIG. 7.

Figure 7:
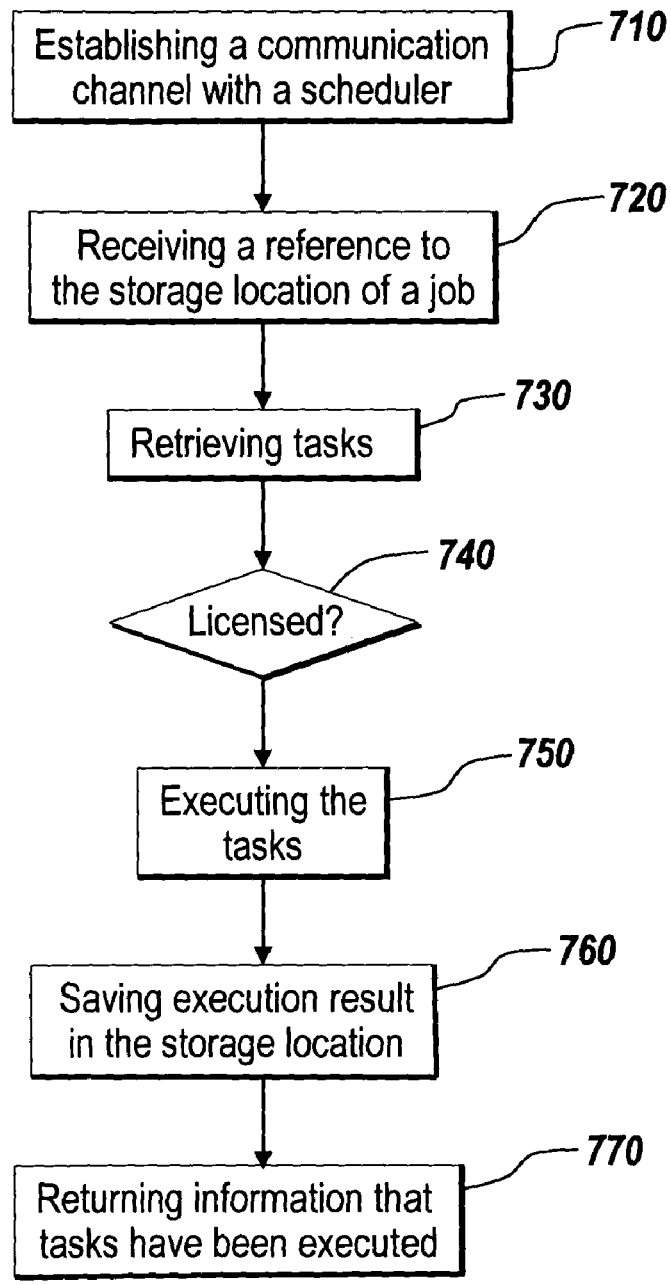
FIG. 7 is a flow chart illustrating an exemplary operation for receiving and executing the job.

FIG. 7 is a flow chart showing an exemplary operation of the worker 140 for retrieving and executing a job or tasks. The worker 140 establishes a communication channel with the scheduler 131, as described above with reference to FIGS. 3 and 4 (step 710). After establishing the communication channel with the scheduler 131, the worker 140 receives the reference to the storage location of the job or tasks from the scheduler 131 (step 720). With the reference to the storage location of the job or tasks, the worker 140 may retrieve the job or tasks from the storage location (step 730). The worker 140 may extract the license information included in the job (step 740). If necessary software components and products are licensed, the worker executes the designated task in the job (step 750) and saves the result of executing the task in the storage location (step 760). The worker returns information that the task has been executed by the scheduler 131 (step 770). The scheduler 131, in turn, returns information that the job has been executed to the client 120 (step 640 in FIG. 5). The client 120 can retrieve the result of executing the job from the storage location (step 650 in FIG. 5). Those of ordinary skill in the art will appreciate that the exemplary operation of the worker 140 may apply to other workers including the workers 150 and 160. One of skill in the art will appreciate that the distributed computing system described above is illustrative and not limiting the scope of the present invention.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for communicating with an arbitrary scheduler, the method comprising:
providing an interface on a client device, the interface for:
communicating with the arbitrary scheduler using a scheduler object, where:
the scheduler object is created to represent an arbitrary scheduler selected from a plurality of arbitrary schedulers, and
the scheduler object represents the arbitrary scheduler in the client device;
conveying one or more tasks from the client to remote workers for distributed processing of the one or more tasks by the remote workers;
creating a job on the client device, the job including the one or more tasks;
storing the job in a storage location, the stored job including the one or more tasks;
associating a reference with the storage location of the job, the reference used to provide the job to the remote workers; and
transferring the reference to the storage location of the job from the client device to the arbitrary scheduler through the interface, the arbitrary scheduler using the reference to distribute the one or more tasks to the remote workers.

2. The method of claim 1, wherein the tasks comprise technical computing tasks.

3. The method of claim 1, wherein the reference to the storage location of the job comprises one of a disk location or a memory location where the job is stored.

4. The method of claim 1, wherein the reference to the storage location of the job comprises any of a machine name or an identifying address or a name where the job is stored.

5. The method of claim 4, wherein the job comprises information on software components or products for which the client is licensed.

6. The method of claim 1, wherein the job is stored in any of a binary or text format.

7. The method of claim 1, wherein the method is performed regardless of a platform type of the client device.

8. The method of claim 1, where the transferring further comprises:
transferring arguments so that the scheduler uses the arguments to distribute the job to one or more workers.

9. The method of claim 1, further comprising:
receiving information that the job has been executed from the scheduler through the interface.

10. In a worker device, a method for receiving and executing a job, the method comprising:
establishing a communication channel with an arbitrary scheduler, where the arbitrary scheduler is selected from a plurality of arbitrary schedulers;
receiving from the arbitrary scheduler a reference to a storage location through the communication channel, where:
the reference to the storage location identifies a storage location of a job associated with a client device,
the client device interacts with the arbitrary scheduler using a scheduler object created to represent the arbitrary scheduler selected from a plurality of arbitrary schedulers,
the scheduler object represents the arbitrary scheduler in the client device, and
the job further includes one or more tasks performed on behalf of the client by the worker device;
retrieving the job from the storage location using the reference to the storage location of the job; and
performing one or more of the tasks on behalf of the client when the job is retrieved from the storage location using the reference to the storage location of the job.

11. The method of claim 10, wherein at least one of the one or more tasks comprise technical computing tasks.

12. The method of claim 10, where the performing further comprises executing one or more of the one or more tasks in the job.

13. A system that includes a client device, the system comprising:
a storage device, comprising:
a storage location for storing a job, wherein the job includes one or more tasks;
a processor for:
executing instructions for creating the job in the storage location, and associating a reference with the storage location of the job, where the reference conveys the job from the storage location to a destination over a communication channel; and
a first interface for:
establishing a first communication channel between the client device and an arbitrary scheduler, where the arbitrary scheduler is selected from a plurality of accessible arbitrary schedulers available to the client device,
identifying a scheduler object created for the arbitrary scheduler selected from the plurality of arbitrary schedulers, where:
the identified scheduler object represents the arbitrary scheduler in the client device, and
the identified scheduler object is associated with the arbitrary scheduler,
using the identified scheduler object to interact with the arbitrary scheduler, and
transferring the reference to the storage location of the job to the arbitrary scheduler through the communication channel with the arbitrary scheduler, where the transferring the reference allows the arbitrary scheduler to access the job in the storage location on the client device.

14. The system of claim 13, wherein the tasks comprise technical computing tasks.

15. The system of claim 13, further comprising:
one or more workers for receiving the job from the arbitrary scheduler; and
a second interface for establishing a second communication channel between a worker and the arbitrary scheduler so that the worker receives the reference to the storage location of the job from the arbitrary scheduler through the second communication channel.

16. A non-transitory computer-readable medium holding instructions executable in an electronic device for a method, the method comprising the steps of:

provide an interface on a client device, where:
the interface includes a first scheduler object created for an arbitrary scheduler selected from a plurality of arbitrary schedulers,
the first scheduler object represents the arbitrary scheduler in the client device,
a second scheduler object created for another arbitrary scheduler selected from the plurality of arbitrary schedulers represents the another arbitrary scheduler that differs from the arbitrary scheduler,
the interface communicates with the arbitrary scheduler using the first scheduler object, and
the interface conveys one or more tasks from the client to remote workers for distributed processing of the one or more tasks by the remote workers;
creating a job on the client device, the job including the one or more tasks;
storing the job in a storage location, the stored job including the one or more tasks;
associating a reference with the storage location of the job, the reference used to provide the job to the remote workers; and
transferring the reference to the storage location of the job to the arbitrary scheduler through the interface, the arbitrary scheduler using the reference to distribute the one or more tasks to the remote workers.

17. The medium of claim 16, wherein the tasks comprise technical computing tasks.

18. The medium of claim 16, wherein the reference to the storage location of the job comprises one of a disk location or a memory location where the job is stored.

19. The medium of claim 16, wherein the reference to the storage location of the job comprises any of a machine name or an identifying address or a name where the job is stored.

20. The medium of claim 19, wherein the job comprises information on software components or products for which the client is licensed.

21. The medium of claim 16, wherein the job is stored in any of a binary or text format.

22. The medium of claim 16, wherein the method is performed regardless of a platform type of the electronic device.

23. The medium of claim 16, wherein the step of transferring comprises the step of:
transferring arguments so that the scheduler uses the arguments to distribute the job to one or more workers.

24. The medium of claim 16, wherein the method further comprises the step of:
receiving information that the job has been executed from the scheduler through the interface.

25. A non-transitory medium holding instructions executable in an electronic device for a method, the method comprising the steps of:

establishing a communication channel with an arbitrary scheduler, where:
the arbitrary scheduler is selected from a plurality of arbitrary schedulers,
a client device interacts with the arbitrary scheduler using a scheduler object, and
the scheduler object is created for the arbitrary scheduler selected from the plurality of arbitrary schedulers, where the scheduler object represents the arbitrary scheduler in the client device;
receiving from the arbitrary scheduler a reference to a storage location through the communication channel, the reference to the storage location identifying a storage location of a job associated with a client device, the job further including one or more tasks performed on behalf of the client device by the worker device;
retrieving the job from the storage location using the reference to the storage location of the job; and
performing one or more of the tasks on behalf of the client device when the job is retrieved from the storage location using the reference to the storage location of the job.

26. The medium of claim 25, wherein the tasks comprise technical computing tasks.

27. The medium of claim 25, wherein the method further comprises the step of:
executing one or more tasks in the job.

* * * * *